July 23, 1929.  W. H. CARRIER  1,721,614
LUBRICATING, SEALING, AND THRUST BALANCING
MEANS FOR COMPRESSORS AND THE LIKE
Filed Feb. 26, 1926  4 Sheets-Sheet 3

INVENTOR.
Willis H. Carrier,
By Parker & Prochnow,
ATTORNEYS.

July 23, 1929. W. H. CARRIER 1,721,614
LUBRICATING, SEALING, AND THRUST BALANCING
MEANS FOR COMPRESSORS AND THE LIKE
Filed Feb. 26, 1926    4 Sheets-Sheet 4
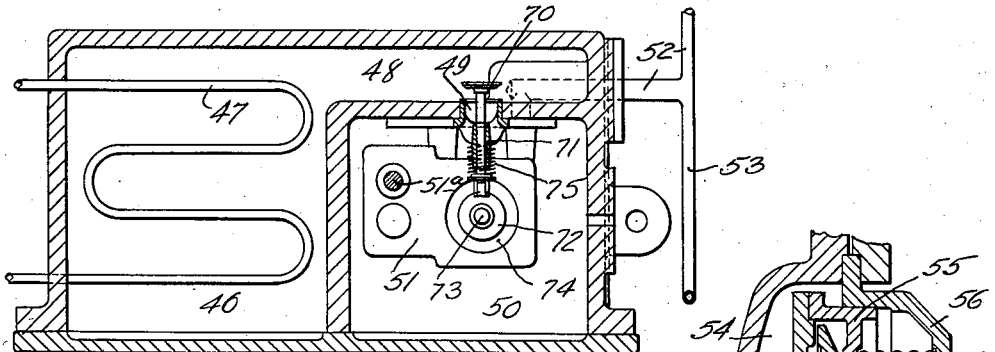
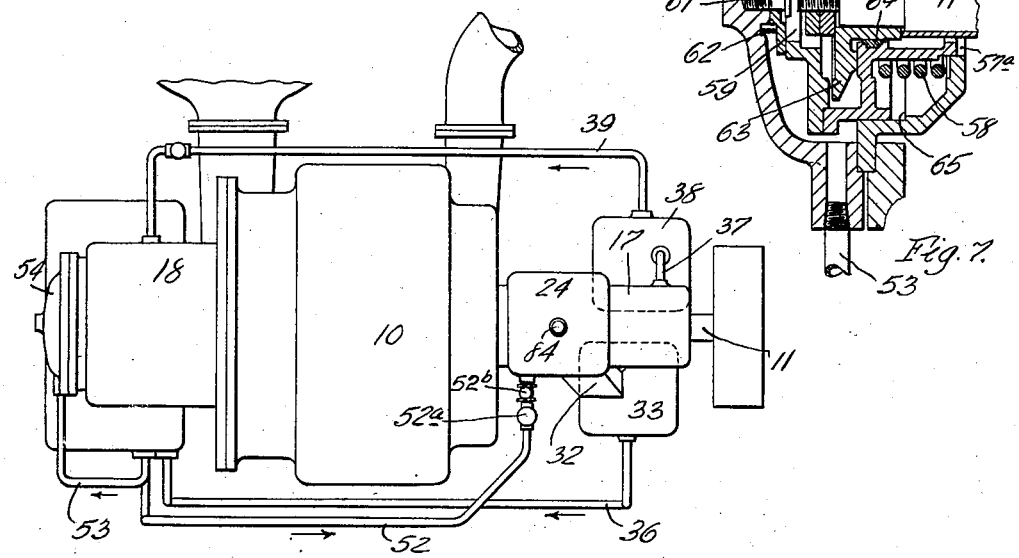
INVENTOR.
Willis H. Carrier
By Parker & Prochnow,
ATTORNEYS.

Patented July 23, 1929.

1,721,614

UNITED STATES PATENT OFFICE.

WILLIS H. CARRIER, OF ESSEX FELLS, NEW JERSEY, ASSIGNOR TO CARRIER ENGINEERING CORPORATION, OF NEWARK, NEW JERSEY.

LUBRICATING, SEALING, AND THRUST-BALANCING MEANS FOR COMPRESSORS AND THE LIKE.

Application filed February 26, 1926. Serial No. 90,848.

This invention relates to mechanism for use with rotary or centrifugal fluid compressors, vacuum pumps and the like for lubricating and cooling the bearings for the compressor shaft, sealing the opening in the compressor casing through which the rotary compressor shaft passes and regulating or balancing the end thrust of the compressor shaft caused by the pressure of the fluid being compressed on the unequal surfaces of the compressor rotor. The improvements are particularly desirable for use with the compressors of refrigeration apparatus which operate on the vapors of volatile fluids at pressures below atmospheric pressure, but are applicable also to compressors and vacuum pumps for other purposes.

In the operation of compressors of vacuum pumps such as mentioned, it is important to prevent the leakage of vapor or gas from and of air into the compressor, and since these compressors are driven at high speeds, it is essential not only to insure adequate lubrication of the bearings, but also to keep the bearings cool. It is also desirable to provide a liquid seal which will prevent leakage of the air or gas into or out of the compressor through the compressor shaft opening with the minimum of friction when the compressor is in operation, and also to seal the shaft opening to prevent the leakage of air or gas therethrough when the compressor is shut down. Other considerations of importance are to prevent friction due to end thrust on the compressor shaft caused by the unbalanced pressure of the gas or vapor on the compressor rotor, and to reduce to the minimum the absorption or contamination of the vapor or gas being compressed and the lubricating and sealing liquid one by the other.

One object of this invention is to produce a practical, efficient and reliable mechanism whereby these results are attained. Other objects of the invention are to provide a lubricating system for compressors and the like, which will insure an adequate and continuous supply of cool oil to the compressor shaft bearings during the operation of the compressor so as to keep the bearings cool, as well as lubricating them; also to provide means whereby the lubricating oil provides a liquid seal which will act without substantial friction to effectively seal the shaft opening during the operation of the compressor; also to combine with the liquid seal an efficient valve or device which acts automatically when the rotation of the compressor stops, to close or seal the shaft opening against the leakage of air or gas; also to provide means of simple and practical construction which balances the end thrust on the shaft and prevents friction incident thereto, and which in addition acts automatically when the compressor is in operation to unseat the valve or closure device for the shaft opening and hold the same off of its seat so as to prevent friction between these parts while the compressor is in operation; also to make provision for separating from the lubricating and sealing oil, the air and refrigerant vapor or gas which is absorbed thereby and to cool the circulating oil in its return from the bearings and liquid seal to the oil circulating pump of the lubricating and sealing system so as to prevent objectionable contamination and deterioration of the oil by the gas or refrigerant, or of the latter by the former, and prevent the oil from gassing so as to prevent efficient operation of the oil circulating pump; and also to improve the construction and operation of lubricating, sealing and cooling means for rotary gas compressors or vacuum pumps in the other respects hereinafter described and set forth in the drawings:

In the accompanying drawings:

Fig. 5 is a sectional plan view thereof on line 5—5, Fig. 3.

Fig. 6 is a diagrammatic plan view on a reduced scale, of the compressor and oil circulating system.

Fig. 7 is a horizontal section of the thrust bearing and balancing device on line 7—7, Fig. 1.

Figure 1:
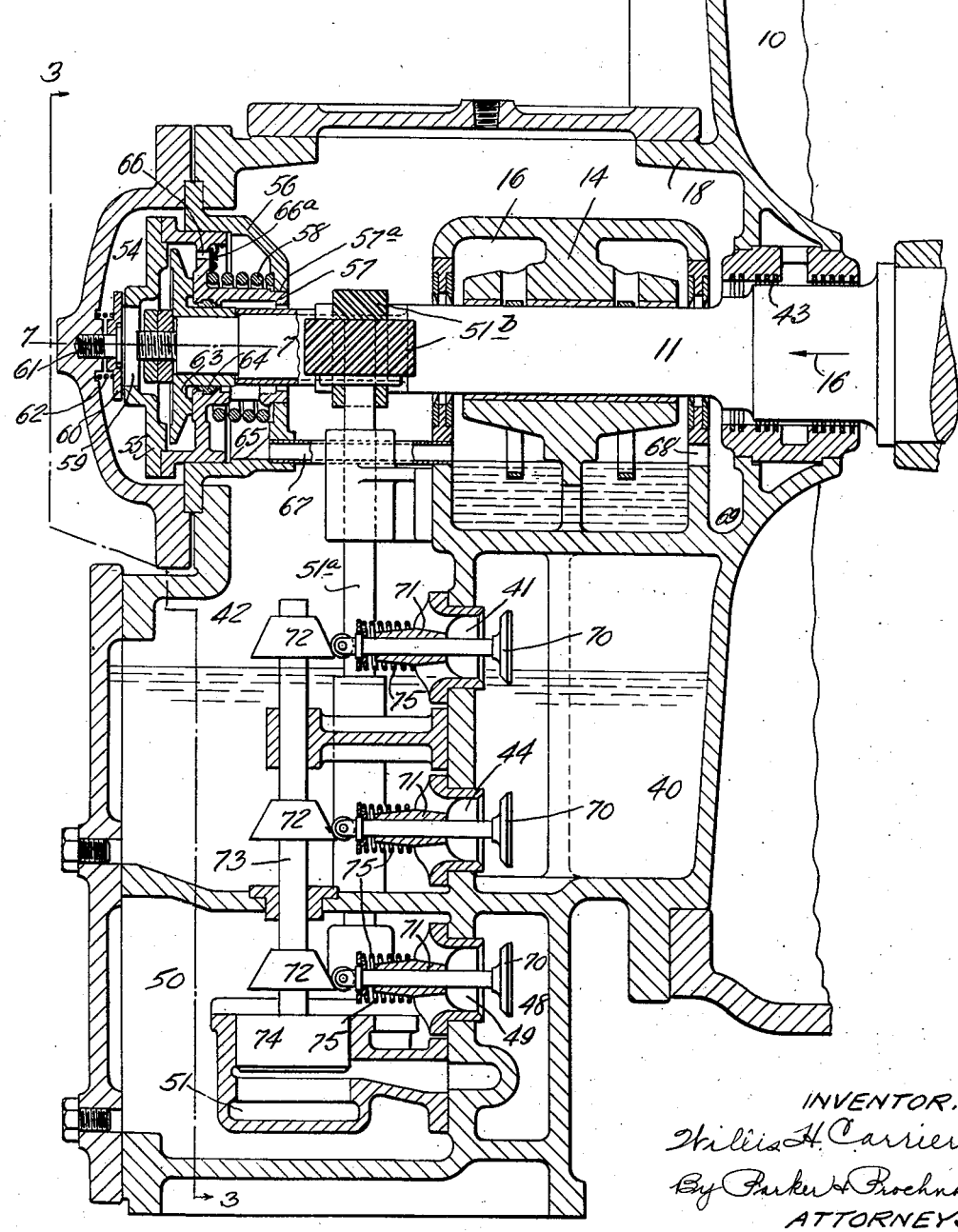
Figs. 1 and 2 are longitudinal, sectional elevations respectively of the suction and pressure portions of a centrifugal compressor provided with lubricating, sealing and thrust balancing means embodying the invention.
Figure 2:
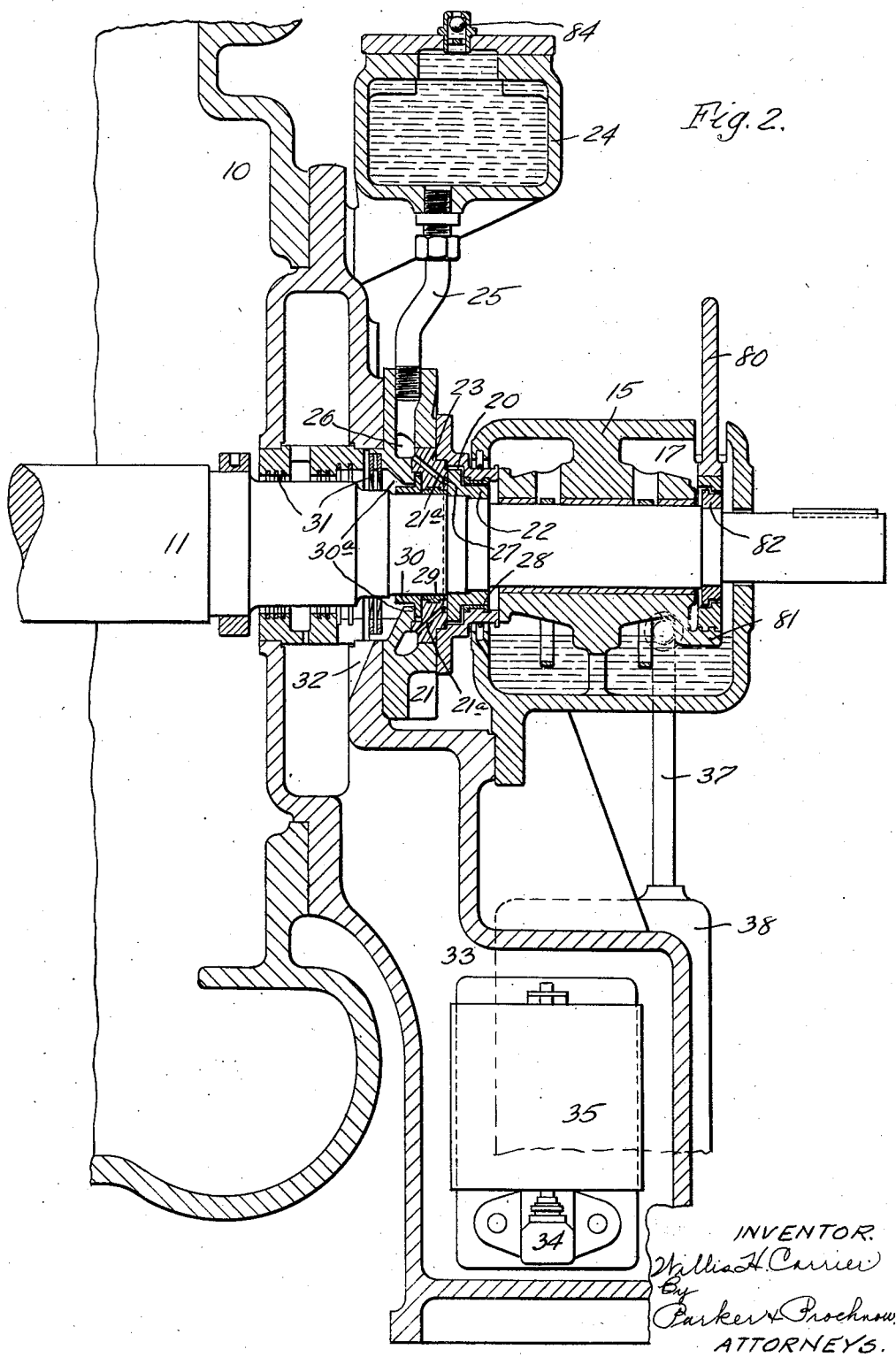

10 represents the casing of a centrifugal compressor or vacuum pump and 11 the compressor shaft on which the rotors or impellers of the compressor (not shown) are mounted. The invention is not concerned with the construction of the compressor itself, which may be of any suitable construction, and therefore is not illustrated in the drawings. It is sufficient for the purpose of this invention to understand that the compressor inlet or suction is at the left hand end and the compressed fluid outlet or pressure chamber at the right hand end of the casing, as illustrated in Figs. 1, 2 and 6; that the impeller shaft extends out of the compressor casing, at one end, preferably the pressure end of the compressor, for connection to the driving motor or device, and is journalled in bearings 14 and 15 respectively at the suction and pressure ends of the compressor, and that the design of the compressor is such that the pressure of the vapor or fluid being compressed exerts a thrust on the shaft toward the left or suction end of the compressor, as indicated by the arrow 16 in Fig. 1. The bearings 14 and 15, which may be of any suitable construction, are preferably located in oil chambers 16 and 17 in the bottoms of which bodies of oil are maintained, and suitable lubricating rings or devices are provided which carry the oil to the bearings continuously during the operation of the compressor. The bearing 14 and its oil chamber at the suction end of the compressor are enclosed, as by a suitable housing 18 so that this bearing is subject to the suction or inlet pressure of the compressor, while the bearing 15 at the pressure end of the compressor may be, and preferably is, located outside of the compressor casing so that this bearing is exposed to atmospheric pressure.

An annular liquid sealing chamber 20, Fig. 2, surrounds the shaft 11 at the pressure end of the compressor between the discharge chamber of the compressor and the bearing 15, the sealing chamber being formed in a casing 21 of suitable construction secured to or formed on the compressor casing. Formed on or secured to the shaft 11, to rotate therewith, and located within the sealing chamber is an annular valve or closure device 22. The inner end of this valve faces a sealing or seat ring 23 which is secured in or formed with the sealing casing 21, and as hereinafter explained, during the operation of the compressor the valve 22 is held out of contact with this opposing seat 23 so as to maintain a definite clearance between these parts, and oil passes from an oil reservoir or reserve chamber 24 where it is maintained at a suitable constant pressure, say from five to ten pounds, to said clearance space between the valve 22 and seat 23, through a pipe or passage 25, a connecting annular passage 26 in the casing 21 and ducts 21ᵃ connecting the passage 26 to an annular groove 27 in the outer face of the seat ring 23. Part of the oil passes from this space through the sleeve or bushing 28 surrounding the valve hub to the adjacent bearing 15 so as to always maintain the requisite body of oil in the oil chamber 17. As hereinafter explained, the oil is cooled before delivery to the sealing chamber and bearing and, therefore, serves as a cooling medium for the bearing as well as maintaining the requisite body of oil in the oil chamber 17. Another portion of the oil escapes through the bushing 29 in the sealing ring 23 and past a loose packing ring 30 which is preferably of L-shape in longitudinal section. This ring has a close running fit on the shaft and does not revolve with the shaft but is free to play laterally with the shaft, due to any eccentricity of rotation of the shaft, in an annular cavity 30ᵃ in the sealing casing at the inner side of the sealing ring 23. The packing ring 30 also has a close sliding fit between the opposite end faces of the cavity 30ᵃ and is held from rotation by the oil pressing it against the inner end face of the cavity 30ᵃ. This packing ring 30 serves to restrict the leakage of oil past it along the shaft toward the compressor casing due to the difference between the external atmospheric pressure and the lower pressure in the pressure end of the compressor, which is under a partial vacuum corresponding to the vacuum in the condenser to which the compressed fluid is delivered by the compressor. The oil leaking past the loose packing ring 30 is stripped off of the shaft by suitable labyrinth packings 31 which prevent it from finding its way into the impeller chamber of the compressor, and the oil escapes from the labyrinths through a passage 32 to a trap 33 by which it is trapped back through a suitable pipe or passage 36 for return to the oil circulating pump, as hereinafter explained. The trap 33 can be provided with a valve 34 actuated by a float 35, or can be any other suitable type of trap. Also on the atmospheric side of the sealing device, the oil from the oil chamber for the bearing 15 discharges through an overflow pipe 37 to a second trap 38, hereinafter called the "atmospheric trap," which may be similar to the trap 33, and by which the oil is trapped back through a pipe or passage 39 for return to the oil pump.

Figure 3:
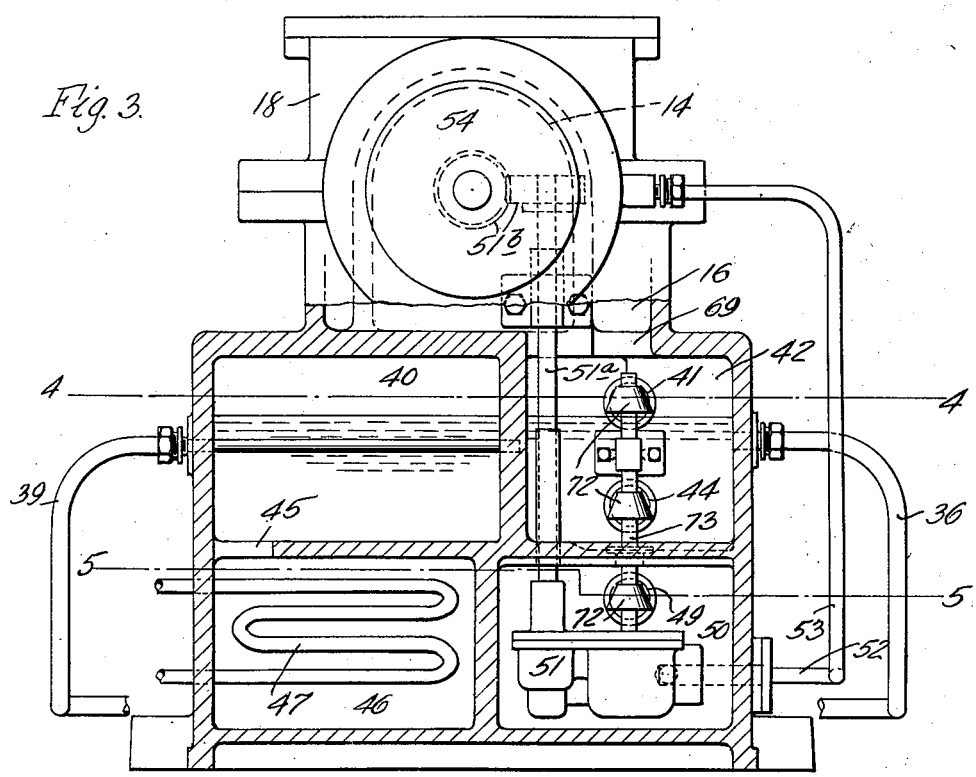
Fig. 3 is a transverse, sectional elevation of the oil pump, oil cooling chamber and associated parts on line 3—3, Fig. 1.
Figure 4:
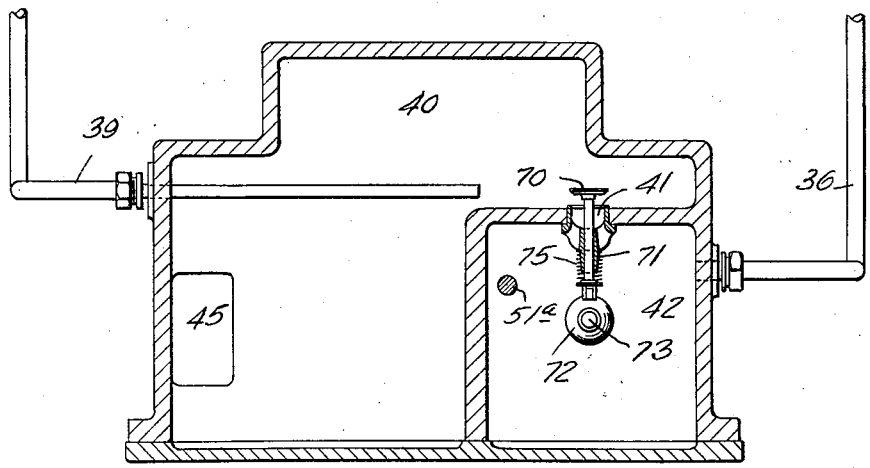
Fig. 4 is a sectional plan view thereof on line 4—4, Fig. 3.

40 represents a separating chamber provided in the housing 18 at the suction end of the compressor and connecting by a suitable opening 41, see Figs. 1 and 3, in its upper portion with an adjoining chamber 42 which communicates through the bearing 14 at the suction end of the compressor and through a suitable labyrinth packing 43 with the inlet or suction chamber of the compressor. The oil return pipe 39 from the atmospheric trap 38 discharges into the separating chamber 40 and the return pipe 36 from the vacuum trap 33 discharges into the chamber 42 from which the oil passes into the separating chamber through a hole 44 connecting the lower portions of the chambers. Oil is also returned from the other bearing 14 through the chamber 42 to the separating chamber 40, as hereinafter explained. The effect of the labyrinth 43 is to prevent too rapid a relief of the pressure in the bearing chamber 16 and connected separating chamber 40, so that boiling of the oil does not occur in the separating chamber 40 at any time at too rapid a rate such as would be due to a sudden change of speed or increase of vacuum which would change the boiling point of the vapor or refrigerant in the oil. From the separating chamber 40, the oil passes, as presently explained, first to an oil cooler and then to the oil circulating pump. The warm oil coming into the separating chamber 40 from the bearings is permitted to discharge its gas through the upper opening 41 before the oil goes to the cooler. The idea is to get rid of all included air and absorbed vapor or refrigerant while the oil is hot, as it is coming from the hot end of the compressor. Under normal operating conditions, the percentage of refrigerant in the oil is not sufficient to interfere with proper lubrication if it is not allowed to boil off too suddenly at any time. The vapor is thus boiled off from the oil and the air separated from the oil in the separating chamber before the oil is returned to the cooler and pump, so that when the oil reaches the pump it is practically free from air and absorbed vapor or gas. The oil discharges from the separating chamber 40 through a suitable opening or passage 45, which is shown in the bottom of the chamber 40, into a cooling chamber 46 in which is located an oil cooler 47 of any suitable kind. The cooler 47 shown consists of a coil submerged in the oil in the cooling chamber and through which water or other cooling medium flows. From the cooling chamber 46, the oil passes through a passage 48 and opening 49 into a pump chamber 50 in which an oil circulating pump 51 of any suitable construction is located. This pump is driven so as to operate only when the compressor is in operation. For instance, the pump shaft 51$^a$, see Figs. 1 and 3, is connected by gears 51$^b$ to and driven by the compressor shaft 11. Thus, cool oil freed from air and gas or vapor is delivered to the pump, so that the pump does not give trouble by gassing and losing its suction as it would if the oil in the pump chamber were of high enough temperature to cause it to suddenly boil. The described arrangement of first ridding the oil of its gas or vapor and cooling the oil thus overcomes the difficulty which has been experienced in pumping oil which contains refrigerant.

The oil pump 51 delivers the oil through a suitable pipe or passage 52 provided with a check valve 52$^a$ and a pressure-reducing valve 52$^b$ to the oil reservoir 24 and maintains the required pressure therein, and this reservoir feeds the oil to the seal and bearing at the pressure end of the compressor. The oil is also delivered under pressure directly from the pump 51 through a suitable pipe or passage 53 to a thrust bearing chamber 54 which encloses the left hand end of the compressor shaft and also a thrust bearing and balancing device for the compressor shaft. The pressure in this chamber is maintained by the oil pump independently of the pressure on the oil reservoir, or reserve chamber 24, and the pressure in the chamber 54 depends on the amount of thrust exerted by the gas or vapor being compressed upon the unequal areas of the rotors of the compressor.

The thrust bearing and balancing device is preferably constructed as follows:—

55 represents a hollow piston arranged to move axially of the compressor shaft in a cylindrical portion 56 of the chamber 54. This piston is provided with a tubular hub 57 which surrounds the compressor shaft and is guided in an opening 57$^a$ in the inner end of the chamber 54, and the piston is pressed outwardly or toward the left by a suitable spring 58, which, as shown, surrounds the hub 57 between the piston and the inner end of the chamber 54. The outer end of the piston 54 is provided with an oil admission opening 59 adapted to be closed by a spring pressed valve 60 axially movable in the chamber 54 opposite the piston. As shown, this valve is slidably mounted on a headed stud 61, and the inward movement of the valve, which is moved inwardly by a spring 62, is limited by the head of the stud 61. Rigidly secured on the compressor shaft within the hollow piston 55 with its outer end facing and close to the outer end of the piston, is a disk 63, the hub of which slidably fits in an annular bushing or packing ring 64 in the hub of the piston. The inner side of the disk 63 is adapted to engage a stop or shoulder on the inner end wall of the hollow piston.

In the normal position of the parts when the compressor is not running, the hollow piston 55 is in its outer position shown in Fig. 7, to which it is moved by the spring 58, and the valve 60 closes the oil admission opening 59 to the interior of the piston. When the compressor starts up, the oil pump, which is geared thereto, forces oil into and creates a pressure in the thrust bearing chamber 54 from which there is then only a slight leakage escape as the admission opening 59 to the hollow piston is closed by the valve 60. The piston is moved inwardly by the oil pressure and the valve 60 moves with the piston for about one-half the travel of the piston when the movement of the valve is arrested by engagement with the head of the valve stud. At this point the sealing valve 22 at the pressure end of the compressor has begun to leave its seat or sealing ring 23. From this point on, the piston 55 is forced to the right until it is arrested by contact with the stop shoulder 65 at the inner end of the cylindrical piston cavity, when it will have moved a short distance, preferably about 3/32", and there will be a narrow opening of about 3/64" between the admission valve 60 and the valve seat on the outer end of the piston to allow the oil to enter the interior of the hollow piston 55 and create a pressure against the thrust disk on the compressor shaft, whereby the thrust of the shaft is balanced by the oil pressure exerted against the disk. Since the feed of the oil is positive, and since the thrust on the shaft is always toward the suction end of the compressor, that is toward the left, in Fig. 1, the clearance between the disk 63 and the piston 55 determines the pressure which is required to counteract the thrust of the compressor rotors. The piston 55 is provided, preferably, at the upper portion of its inner end, with a hole 66 through which a regulated escape of the oil from the hollow piston occurs during the operation of the compressor. The escape of oil through the hole can be regulated or restricted as required, in any suitable way, as for instance, by furnishing the hole with a flap valve 66$^a$ which is closed by spring pressure so as to cause a limited back pressure in the hollow piston, but which is opened by the oil when a predetermined pressure is exceeded. This arrangement seals the disc chamber with oil and excludes the air, thus preventing frothing and vaporization of the oil otherwise caused by the rotation of the disc in a mixture of oil with air or gas. This is important in preventing the possibility of oil, foam and vapor being carried through the bearing labyrinths into the inlet of the compressor. It also keeps the oil free from contamination with air and gas in the pumping chamber which would otherwise cause trouble due to the oil pump "gassing" and failing to pump.

The oil escaping past or through the hollow piston flows in part to the oil chamber 16 for the bearing at the suction end of the compressor through a suitable pipe or passage 67, thus keeping this bearing cooled and always maintaining a fresh supply in the oil chamber. The oil overflows from this oil chamber 16 through a suitable opening 68 and thence flows through a passage 69, exterior to the oil chamber 16 into the chamber 42 in the housing 18, from which the oil passes through the opening 44 in the lower part of the chamber into the separating chamber 40, from which the oil flows with the other oil in the chamber coming from the pressure side of the compressor to the oil cooler and oil pump.

The gas escape opening 41 from the separating chamber 40 and the oil inlet opening 44 to this chamber and the opening 49 between the cool oil passage 48 and the pump chamber are preferably arranged in vertical alinement, as shown in Figs. 1 and 3, and are controlled by valves 70 which are automatically controlled by the oil pressure produced by the oil pump. As shown, these three valves are provided with stems slidable endwise in guides 71 and having at their ends rollers bearing against cams or cones 72 on a vertically movable rod 73 which is connected to a piston 74, or other device, adapted to be moved by the pressure of the oil discharged by the pump. When the oil pump is shut down, these valves are closed by suitable springs 75 and cut off the separating chamber 40 and the cooling and pump chambers from the chamber 42, and no refrigerant vapor can be further absorbed by the oil in the cooling and pump chambers but the instant the oil pump starts, the piston 74 is raised, and through the medium of the cams 72, opens the three valves simultaneously The provision of these valves and their actuating mechanism is not necessary so long as the compressor operates under normal conditions in view of the above described means for ridding the oil of the vapor or gas before the oil passes to the oil cooler and pump. After the oil has passed through the cooler, its temperature is so low that it only boils at a considerably higher vacuum than exists in the separating chamber 40. The valves and operating mechanism indicated, however, are desirable in the event that an extreme vacuum or sudden change of speed of the compressor should be encountered.

When the compressor is shut down, the oil pump also stops, as before explained, and ceases to produce pressure, and the spring 58 then forces the piston 55, together with the compressor shaft 11 toward the left, as shown in the drawings, and brings the closure valve 22 at the pressure end of the compressor against its seat or sealing ring 23, thus producing a perfect oil sealed closure against atmospheric pressure from without into the compressor. A suitable hand device 80 is also preferably provided by which the shaft can be moved to exert still further pressure of the closure valve 22 against its seat and the accuracy of the automatic closure tested. This device 80 may be of any suitable construction, consisting, for example, of a screw or cam ring adapted to turn in a cooperating stationary bearing 81 and engaging a collar or flange 82 on the shaft for moving the shaft towards the left.

The oil reservoir 24 is provided with an air relief valve or device 84 consisting, for example, of a ball adapted to be seated by the oil rising within the reservoir and adapted to be opened by atmospheric pressure, so that when the machine is shut down this valve acts as a vacuum breaker, and no vacuum can be brought on the oil reservoir 24, which is then opened to the atmosphere. At this time the oil is prevented from discharging from the reservoir by the closure valve 22, which seats tightly against the sealing ring 23 and closes the discharge passages from the reservoir leading to the valve seat.

The thrust bearing and balancing device may be either of the fluid pressure type as hereinbefore described, or it may be a true thrust bearing merely lubricated and cooled by the oil. This is immaterial to the principle of operation of the system. Where a thrust bearing is used a relief valve is required instead of the reducing valve 52$^b$ which regulates. The reducing valve 52$^b$ is required in this system of regulation so that there may not be an excessive pressure on the reserve oil chamber 24 and the sealing member. From five to ten pounds pressure is required. More pressure than this causes an excessive amount of oil to flow and also causes foaming. If an ordinary thrust bearing is used at 63, the valve 52$^b$ becomes a relief valve which merely maintains between five and ten pounds pressure on the entire system.

Characteristic features of lubricating and sealing systems embodying my invention are, first, an oil chamber under atmospheric pressure to take the oil from the atmospheric side of the seal, and second, two oil chambers under vacuum. They may both be under the same vacuum or one may be under a higher vacuum than the other. In each case the oil is trapped back from the chambers having the higher pressures to the chamber having the lowest pressure in which the pump is located for supplying the lubrication and cooling the seal and, preferably also to operate a piston or device which will move the seal ring 22 off of its seat 27 whenever the machine is in rotation. Of course, this sealing device is not necessarily moved off the seat by means of the oil pressure, but could be moved off by other means such as a centrifugal device.

I claim as my invention:

1. The combination with a fluid compressor, of an oil seal for the shaft opening in the compressor casing, an oil chamber under atmospheric pressure which receives the oil from the atmospheric side of the seal, a second chamber under a pressure below atmospheric pressure which receives the oil from the vacuum side of said seal, a third chamber under a pressure at least as low as said second chamber, a pump located in said third chamber for supplying the oil to the seal and lubricating the compressor, and means for trapping back the oil from said first and second chambers to said third chamber.

2. The combination with a fluid compressor, of an oil seal for the shaft opening in the compressor casing, an oil chamber under atmospheric pressure which receives the oil from the atmospheric side of the seal, a second chamber under a pressure below atmospheric pressure which receives the oil from the vacuum side of said seal, a third chamber under a pressure at least as low as said second chamber, a pump located in said third chamber for supplying the oil to the seal and lubricating the compressor, means for trapping back the oil from said first and second chambers to said third chamber, and a device which is adapted to seat for closing the shaft opening when the compressor stops and which is held off of its seat when the compressor is running.

3. The combination with a fluid compressor having a rotary shaft, of a liquid sealing device for the opening in the compressor casing through which the compressor shaft passes, an oil circulating pump and connections for supplying oil to the liquid sealing device, and a separating chamber through which the oil passes in its return from said sealing device to the pump and which is in communication with a low pressure portion of the compressor for maintaining in said chamber a pressure below the discharge pressure of the compressor and for separating gas and air from the oil.

4. The combination with a fluid compressor having a rotary shaft, bearings for the compressor shaft, a liquid sealing device for the opening in the compressor casing through which the compressor shaft passes, an oil circulating pump and connections for supplying oil to the bearings and said liquid sealing device, and a separating chamber through which the oil passes in its return from the bearings and liquid sealing device to the pump and which is in communication with a low pressure portion of the compressor for maintaining in said chamber a pressure below the discharge pressure of the compressor and for separating gas and air from the oil.

5. The combination with a fluid compressor having a rotary shaft, of bearings for the compressor shaft, the bearing at the suction end of the compressor being enclosed and communicating with the compressor suction and the bearing at the pressure end of the compressor being exposed to atmospheric pressure, an oil circulating pump and connections for supplying oil to the shaft bearings, and a separating chamber through which the oil passes in its return from the bearings to the pump and which is in communication with a low pressure portion of the compressor for maintaining in said chamber a pressure below the discharge pressure of the compressor and for separating gas and air from the oil.

6. The combination with a fluid compressor having a rotary shaft, of bearings for the compressor shaft, the bearing at the suction end of the compressor being enclosed and communicating with the compressor suction and the bearing at the pressure end of the compressor being exposed to atmospheric pressure, a liquid sealing device for the opening in the compressor casing through which the compressor shaft passes, said sealing device being disposed between the pressure chamber of the compressor and the adjacent bearing, an oil circulating pump and connections for supplying oil to said bearings and liquid sealing device, and a separating chamber through which the oil returns from the bearings and liquid sealing device to the oil pump and which is in communication with the compressor suction for separating gas and air from the oil.

7. The combination with a fluid compressor having a rotary shaft, of a liquid sealing device for the opening in the compressor casing through which the compressor shaft passes, an oil circulating pump and connections for supplying oil to the liquid sealing device, a separating chamber through which the oil passes in its return from said sealing device to the pump and which is in communication with the compressor suction for separating gas and air from the oil, and an oil cooler through which the oil passes from the separating chamber to the pump.

8. The combination with a fluid compressor having a rotary shaft, of bearings for the compressor shaft, a liquid sealing device for the opening in the compressor casing through which the compressor shaft passes, an oil circulating pump and connections for supplying oil to the bearings and said liquid sealing device, a separating chamber through which the oil passes in its return from the bearings and liquid sealing device to the pump and which is in communication with the compressor suction for separating gas and air from the oil, and an oil cooler through which the oil passes from the separating chamber to the pump.

9. The combination with a fluid compressor, of bearings for the compressor shaft, one enclosed and communicating with the compressor suction and the other exposed to atmospheric pressure at the pressure end of the compressor, an oil reservoir, an oil circulating pump and connections for supplying oil to said reservoir and maintaining a pressure therein, oil supply connections from the reservoir to said bearing at the pressure end of the compressor, a trap through which the oil is returned from said bearing at the pressure end of the compressor to the oil pump, supply connections from the pump to the other bearing, and return connections from the last mentioned bearing to the pump.

10. The combination with a fluid compressor, of bearings for the compressor shaft, one enclosed and communicating with the compressor suction and the other exposed to atmospheric pressure at the pressure end of the compressor, a liquid sealing device for the shaft opening located between the pressure chamber of the compressor and the adjacent bearing, an oil reservoir, an oil circulating pump and connections for supplying oil to said reservoir and maintaining a pressure therein, oil supply connections from said reservoir to said sealing device and from the latter to said adjacent bearing, and separate traps and connections through which the oil is returned from said liquid sealing device and adjacent bearing to the oil pump.

11. The combination with a fluid compressor, of bearings for the compressor shaft, one enclosed and communicating with the compressor suction and the other exposed to atmospheric pressure at the pressure end of the compressor, a liquid sealing device for the shaft opening located between the pressure chamber of the compressor and the adjacent bearing, an oil reservoir, an oil circulating pump and connections for supplying oil to said reservoir and maintaining a pressure therein, oil supply connections from said reservoir to said sealing device and from the latter to said adjacent bearing, separate traps and connections through which the oil is returned from said liquid sealing device and adjacent bearing to the oil pump, and a separating chamber communicating with a low pressure part of the compressor, and an oil cooler through which the oil returns from said traps to the oil pump.

12. The combination with a fluid compressor having a rotary shaft and a chamber in which said shaft rotates, an oil circulating pump and connections for supplying oil to said chamber, a separating chamber through which the oil passes in its return from said shaft chamber to said pump and which is in communication with the compressor suction for separating gas and air from the oil, a valve controlling the communication between said separating chamber and the compressor suction, and mechanism actuated by the oil pressure for holding said valve open when the oil pump is running and closing said valve when the oil pump stops.

13. The combination with a fluid compressor having a rotary shaft and a chamber in which said shaft rotates, an oil circulating pump and connections for supplying oil to said chamber, a separating chamber and an oil cooler through which the oil passes in succession in its return from said shaft chamber to said pump, said separating chamber being in communication with the compressor suction, a valve controlling the communication between said separating chamber and the compresor suction, and mechanism actuated by the oil pressure for holding said valve open when the oil pump is running and closing said valve when the oil pump stops.

14. The combination with a fluid compressor having a rotary shaft and a chamber in which said shaft rotates, an oil circulating pump and connections for supplying oil to said chamber, a separating chamber and an oil cooler through which the oil passes in succession in its return from said shaft chamber to said pump, a chamber in communication with the compressor suction and communicating by upper and lower openings with said separating chamber, valves controlling said upper and lower openings, and mechanism actuated by the oil pressure for holding said valves open when the oil pump is running and closing said valves when the oil pump stops.

15. The combination with a fluid compressor having a rotary shaft and a chamber in which said shaft rotates, an oil circulating pump and connections for supplying oil to said chamber, a separating chamber and an oil cooler through which the oil passes in succession in its return from said shaft chamber to said pump, a chamber in communication with the compressor suction and communicating by upper and lower openings with said separating chamber, a chamber enclosing the oil pump and communicating by an opening with said cooler, valves controlling said three openings, and mechanism actuated by the oil pressure for holding said valves open when the oil pump is running and closing said valves when the oil pump stops.

16. The combination with a fluid compressor having a shaft extending through an opening in the compressor casing, of an oil seal for said shaft opening, a chamber which receives the oil from the atmospheric side of the seal and which is open to the atmosphere, a second chamber which receives the oil from the vacuum side of the seal and in which a pressure less than one atmosphere is maintained, a pump which supplies the oil to said seal and is located in an enclosure in which the pressure is at least as low as in said second chamber, and means for returning the oil from said first and second chambers to the pump.

17. The combination with a fluid compressor, of bearings for the compressor shaft, one enclosed and communicating with the compressor suction and the other exposed to atmospheric pressure at the pressure end of the compressor, a liquid sealing device for the shaft opening located between the pressure chamber of the compressor and the adjacent bearing, an oil reservoir, an oil circulating pump and connections for supplying oil to said reservoir and maintaining a pressure therein, and oil supply connections from said reservoir to said sealing device and from the latter to said adjacent bearing.

18. The combination with a fluid compressor having a rotary shaft and a chamber in which said shaft rotates, an oil circulating pump and connections for supplying oil to said chamber, a separating chamber through which the oil passes in its return from said shaft chamber to said pump and which is in communication with the compressor suction for separating gas and vapor from the oil, and mechanism controlled by the oil pressure for shutting off communication between said separating chamber and the compressor suction when the oil pump stops.

19. The combination with a fluid compressor having a rotary shaft and a chamber in which said shaft rotates, an oil circulating pump and connections for supplying oil to said chamber, a separating chamber through which the oil passes in its return from said shaft chamber to said pump and which is in communication with the compressor suction for separating gas and vapor from the oil, and mechanism which operates automatically for shutting off communication between said separating chamber and the compressor suction when the oil pump stops.

20. The combination with a fluid compressor having a rotary shaft and a chamber in which said shaft rotates, an oil circulating pump and connections for supplying oil to said chamber, a separating chamber and an oil cooler through which the oil passes in succession in its return from said shaft chamber to said pump, said separating chamber being in communication with the compressor suction, and mechanism controlled by the oil pressure for shutting off communication between said separating chamber and the compressor suction when the oil pump stops.

21. The combination with a gaseous fluid compressor, of a bearing for the compressor shaft, an oil circulating pump and connections for supplying oil to said bearing, a separating chamber through which the oil passes in its return from the bearing to the pump and which is in communication with a low pressure portion of the compressor for maintaining in said chamber a pressure below the discharge pressure of the compressor and for separating gaseous fluid from the oil, and an oil cooler by which the oil is cooled in its passage from the separating chamber to the pump.

22. The combination with a gaseous fluid compressor, of a bearing for the compressor shaft, an oil circulating pump and connections for supplying oil to said bearing and connections for returning oil from the bearing to the pump, a separating chamber through which the oil passes in its return from the bearing to the pump and which communicates with a low pressure portion of the compressor for maintaining in said separating chamber a pressure below the discharge pressure of the compressor and for separating gaseous fluid from the oil, and an oil cooler by which the oil is cooled during its return from the bearing to the pump.

23. The combination with a gaseous fluid compressor having a rotary shaft, of bearings for the compressor shaft at the suction and pressure ends of the compressor, the bearing at the one end of the compressor being enclosed and communicating with a low pressure portion of the compressor and the bearing at the other end of the compressor being exposed to atmospheric pressure, an oil circulating pump and connections for supplying oil to the shaft bearings, and a separating chamber through which the oil passes in its return from the bearings to the pump and which is in communication with a low pressure portion of the compressor for maintaining in said chamber a pressure below the discharge pressure of the compressor and for separating gaseous fluid from the oil.

WILLIS H. CARRIER.